United States Patent [19]

O'Brian

[11] 4,142,782
[45] Mar. 6, 1979

[54] DISPLAY ARRANGEMENTS EMPLOYING THERMOCHROMIC COMPOSITIONS

[76] Inventor: Edward D. O'Brian, 1695 W. Crescent Ave., Ste. 564, Anaheim, Calif. 92801

[21] Appl. No.: 564,990

[22] Filed: Apr. 3, 1975

[51] Int. Cl.² .................... G02F 1/01; G09F 13/00
[52] U.S. Cl. ................... 350/354; 40/442; 40/448; 40/542; 40/544
[58] Field of Search ........... 350/160 P; 40/28 C, 40/130 R, 130 M

[56] References Cited

U.S. PATENT DOCUMENTS

| | | | |
|---|---|---|---|
| 3,252,374 | 5/1966 | Stookey | 350/160 P |
| 3,354,565 | 11/1967 | Emmons et al. | 350/160 P X |
| 3,396,378 | 8/1968 | Keith, Jr. | 350/160 P X |
| 3,516,185 | 6/1970 | Paine | 350/160 P X |
| 3,766,061 | 10/1973 | Mahler et al. | 350/160 P X |

Primary Examiner—John K. Corbin
Assistant Examiner—Rolf Hille
Attorney, Agent, or Firm—Edward D. O'Brian

[57] ABSTRACT

Display arrangements useful as art forms and useful in advertising applications can be constructed by coating areas of the surface of a support with differently colored compositions, each of which is capable of appearing as being of one color at one temperature and as being of another color at a different temperature. The compositions should be differently colored at at least one temperature. The color-temperature effects achieved are obtained through the use of what are termed reversible thermochromic compounds or compositions. Elements may be provided on the support for regulating the temperatures of the various areas.

7 Claims, 9 Drawing Figures

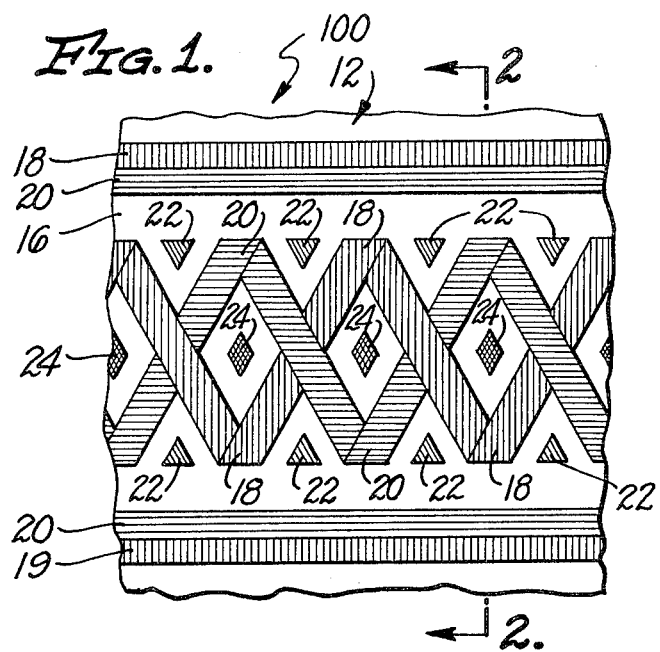
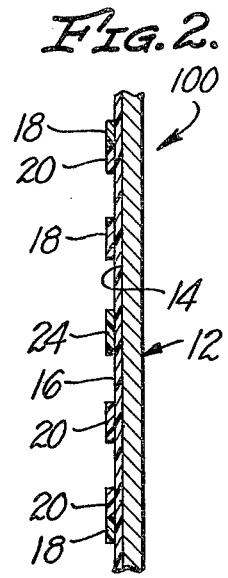
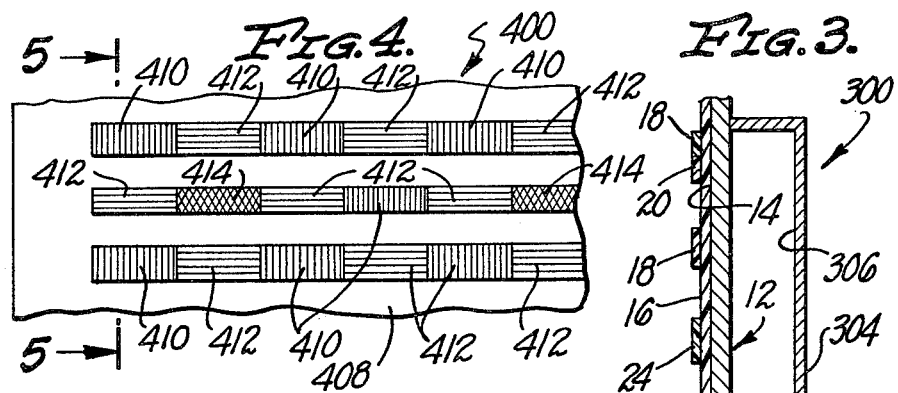
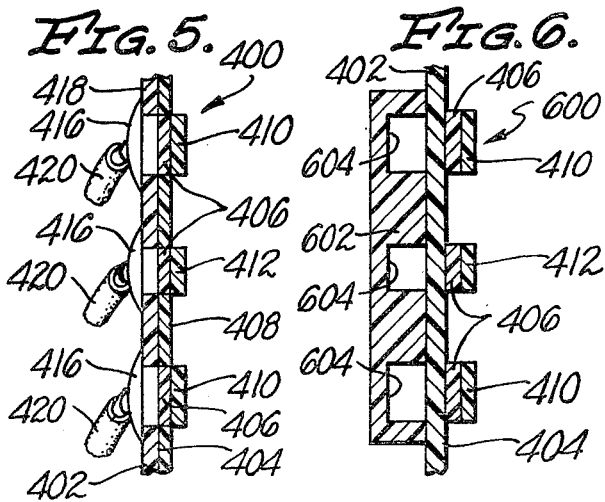

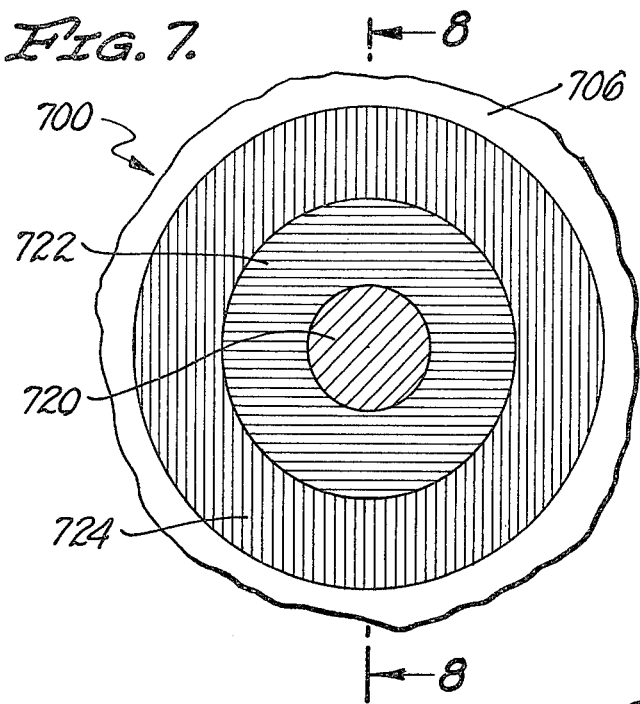
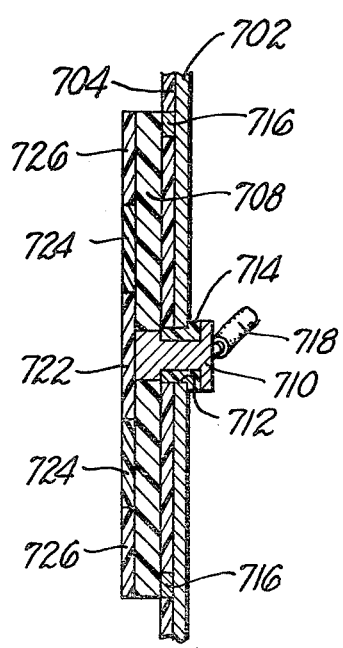
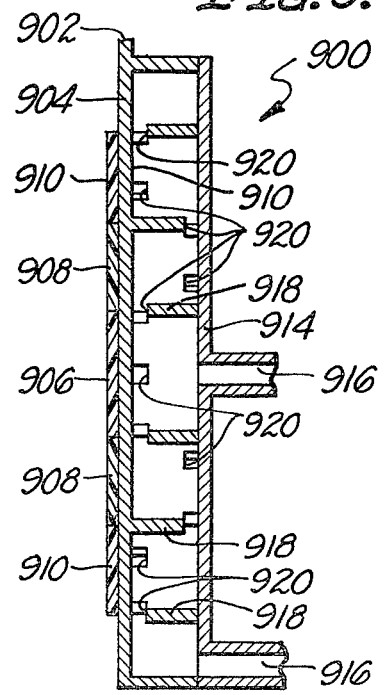

DISPLAY ARRANGEMENTS EMPLOYING THERMOCHROMIC COMPOSITIONS

BACKGROUND OF THE INVENTION

This specification pertains to what are termed herein as "display arrangements". More specifically it pertains to display arrangements which utilize thermochromic compounds and/or compositions to give or cause different visual effects.

The term "display arrangement" is employed in this specification to designate a composite structure or article which is intended to convey a visual expression or message. Thus, this term is employed to designate various types of advertising signs employing verbally expressed messages of one sort or another. It is also employed in this specification to designate various types of graphic displays which are intended to be viewed. Such graphic displays may consist of a pattern or a picture of one sort or another. From this it will be apparent that this term "display arrangement" is a rather broad term intended to designate a number of items of a utilitarian and/or an artistic nature.

The term "thermochromic" is employed in this specification to designate a characteristic or property of a material or composition causing such a material or composition to visually appear as being of one color at one temperature and another color at another temperature. At times other terms have been utilized to designate thermochromism. Thus, the expressions "thermotropically colored material" and "chromo-thermosensitive material" have on occasion been utilized in the appropriate technical literature in a manner which is synonymous with the manner in which the term or expression "thermochromic material" is used herein. A number of different types of thermochromic materials are known.

Some of such materials are referred to as reversible thermochromic materials as they will change from one color to another and then back again as they are heated and cooled. Other of such materials are irreversible in character in that they will only undergo a single color change on being heated or cooled. The color changes in such materials may be the result of relatively complex chemical considerations. They also may be the result of comparatively simple considerations such as, for example, the absorption of moisture from ambient air and/or the melting of one material into another.

An understanding of the subject matter of this specification does not require a detailed consideration of the nature of thermochromic materials and/or the mechanism used in obtaining thermochromism. The subject matter of this specification relates to the utilization of known thermochromic compounds and compositions in connection with various types of display arrangements so as to obtain changes in the appearances of such display arrangements which are visually stimulating and/or attractive from an aesthetic sense.

As an example of the desirability of using changes in appearance in display arrangements reference may be made to common advertising signs. Such a sign may be constructed so as to have a message and/or various appropriate ornamentations painted upon the sign using conventionally pigmented paint. Once created such a display arrangement will normally always look the same. While this is acceptable for many utilizations it has been established that a change in appearance of the sign will frequently make such a display arrangement more interesting to an observer and/or more apt to catch visual attention.

The recognition of the latter has, of course, led to the development of all sorts of changeable exhibitors, specialized lighting arrangements and the like which are intended to stimulate visual attraction. While expedients of these general types are unquestionably effective it is considered that in general they tend to be undesirable in many applications for one or more of a variety of different reasons, none of which are significant relative to an understanding of the nature of display arrangements as herein set forth.

SUMMARY OF THE INVENTION

A broad objective of the invention set forth in this specification is to provide new and improved display arrangements. This invention is intended to provide display arrangements: which are comparatively advantageous for a number of types of specialized uses; which are capable of providing a variety of visual effects as may be desired by a designer; which are capable of being operated either automatically in accordance with ambient temperature or through the use of comparatively simple temperature controlling means; and which are capable of giving prolonged, reliable performance.

In accordance with this invention these objectives are achieved by providing a display arrangement including a support having a surface and visible areas of different colored compositions located on the surface with the improvement which comprises: each of the compositions appearing as being of one color at one temperature and as being of another color at another different temperature, these compositions appearing as being of different colors at at least one temperature. Such a display arrangement may include a means for regulating the temperatures of the areas so as to cause color changes in the compositions used.

BRIEF DESCRIPTION OF THE DRAWING

The subject matter of this specification is best more fully explained with reference to the accompanying drawing in which FIG. 1 is a partial front elevational view of a pattern type display arrangement in accordance with this invention;

FIG. 2 is a partial cross-sectional view taken at line 2—2 of FIG. 1;

FIG. 3 is a partial cross-sectional view which is similar to FIG. 2 of a modified form of a display arrangement as indicated in FIGS. 1 and 2;

FIG. 4 is a partial front-elevational view of a modified display arrangement in accordance with this invention;

FIG. 5 is a partial cross-sectional view taken at line 5—5 of FIG. 4;

FIG. 6 is a partial cross-sectional view which is similar to FIG. 5 of a modified form of a display arrangement as indicated in FIGS. 4 and 5;

FIG. 7 is a partial front elevational view of another pattern type display arrangement in accordance with this invention;

FIG. 8 is a partial cross-sectional view taken at line 8—8 of FIG. 7; and

FIG. 9 is a partial cross-sectional view which is similar to FIG. 8 of a modified form of a display arrangement as indicated in FIGS. 7 and 8.

In FIGS. 1, 5 and 7 of the drawing various areas are illustrated using lines which are similar to conventional section lines in order to distinguish these areas and in order to indicate that certain of these areas at certain different temperatures will appear as being of different colors. These lines in these figures are not to be taken as designating any specific color because the compositions used with the invention will change in color depending upon temperature.

The various figures of the drawing are intended to designate for explanatory purposes various different display arrangements in accordance with this invention. Because of their function these figures are not drawn to scale. The display arrangements illustrated are considered to embody concepts as are set forth and defined in the appended claims. From a consideration of this entire specification it will be realized that these concepts can be employed in a wide variety of diverse pictures, patterns, signs and the like through the use or exercise of routine artistic or design skill.

DETAILED DESCRIPTION

In FIGS. 1 and 2 of the drawing there is indicated a presently preferred embodiment or form of a display arrangement 10 in accordance with this invention. This display arrangement 10 includes a sheet-like metallic support 12 having a surface 14 which is covered with a thin layer of a conventional paint 16. This layer 16 is in turn covered with areas 20 of a second thermochromic composition. It may also contain areas 22 of a third thermochromic composition and areas 24 of a mixture of two or more different thermochromic compositions such as, for example, the thermochromic compositions used in the areas 18 and 20.

These areas 18, 20, 22 and 24 will normally be created by conventional painting techniques using a coating composition containing a thermochromic compound or composition, an appropriate conventional binder, an appropriate conventional solvent or carrier vehicle, and, at a manufacturer's option, one or more pigments such as a white pigment designed to accentuate or modify one or more colors of the thermochromic compound or composition. The binder used is preferably a conventional transparent or translucent binder which will not obscure the color effects achieved with the invention. A few suitable paint type compositions for use in practicing the invention are considered to be available commercially. It is considered that such compositions may be easily formulated in accordance with conventional techniques as are commonly employed in the paint industry.

The operation of the display arrangement 10 is essentially an automatic matter. As this display arrangement 10 is heated or cooled as the result of ambient temperature changes the areas 18, 20, 22 and 24 will change in color as the temperatures within these areas either rise or fall sufficiently to cause a color change. The transition temperatures at which such color changes will occur in each of the areas 18, 20, 22 and 24 will, of course, vary with the thermochromic compound or composition used in these areas.

It is considered preferable that thermochromic compounds or compositions be chosen for use in the arrangement 10 so that the transition temperatures of these materials will be within the temperature range to which the display arrangement 10 will normally be exposed. With certain known thermochromic compounds or compositions one or more of the color changes may not only be related to a change in temperature but may also be related to the ambient atmosphere. Thus, if some known thermochromic compositions are used these compositions will change in color primarily as the result of the application of heat and the vaporization of water but will reverse to their initial color after cooling as they gradually absorb moisture from the ambient air.

It is presently considered that the display arrangement 10 will probably find its greatest application in connection with the decoration of various automotive type vehicles and that the thermochromic materials used for such vehicles will, because of factors such as availability and cost, tend to change color at temperatures somewhat above normal ambient temperatures. In order to promote color changes when such materials are used it is considered preferable to use as the layer of paint 16 a conventional paint of a dark color, preferably of a carbon black type color, which will readily absorb and radiate heat. The heat absorbed by or radiated from such a layer 16 will be conveyed by conduction through the metal support 12 in such a manner as to promote temperature change in the areas 18, 20, 22 and 24.

It is presently considered that common sheet steel is sufficiently heat conductive to achieve acceptable results with this manner of operation. However, it is considered that a highly heat conductive material such as aluminum will be more effective in promoting a rapid temperature change in the areas 18, 20, 22 and 24 than can be achieved with material such as steel. It is also considered that reasonably rapid color change response to temperature change can be achieved by locating these layers 18, 20, 22 and 24 directly upon the surface 14. For practical reasons it is, however, considered preferable to locate these areas 18, 20, 22 and 24 directly upon the layer of paint 16.

In FIG. 3 of the drawing there is shown a display arrangement 300 which is quite similar to the arrangement 10 and which employs all of the elements of the arrangement 10. For convenience such elements are indicated in FIG. 3 by the numerals previously used to designate them and are not separately described herein. In the arrangement 300 the surface 302 of the support 12 which is normally hidden from view is provided with an enclosed, elongated wall 304 defining a channel 306. A heating or cooling fluid such as air, water or the like may be circulated through the channel 306 for the purpose of causing heat to be conveyed to or taken away from the areas 18, 20, 22 and 24 by conduction.

In FIGS. 4 and 5 of the drawing there is indicated a modified display arrangement 400 in accordance with this invention which includes an electrical nonconductive support 402 having a surface 404 which carries elongated striplike electrical resistance elements 406 of a known type consisting of carbon or related particles in an organic binder. These elements 406 are surrounded on the surface 404 by a layer 408 of paint corresponding to the previously described layer 16. These elements 406 are surmounted by areas 410, 412, and 414 corresponding to the areas 18, 20 and 24 previously described.

Appropriate conventional electrical terminals 416 are carried by the support 402 so as to extend to the rear surface 418 of the support 402. Such terminals 416 are, of course, used at opposed ends of the elements 406. They are employed so that electric currents may be applied through appropriate wires 420 to cause individual of these elements 406 to heat up. When individual of these elements 406 are heated to temperatures which are in excess of the critical temperatures at which the various areas 410, 412 and 414 will change in color appropriate color changes will, of course, be visually observed. The various elements 406 may be individually or collectively operated as may be desired in obtaining different visual effects.

In FIG. 6 of the drawing there is shown a modified display arrangement 600 which is quite similar to the arrangement 400. For convenience those elements of the arrangement 600 which are the same as various elements of the display arrangement 400 are not separately designated herein and are indicated by the numerals previously used to designate such elements. The display arrangement 600 differs from the display arrangement 400 by the omission of the layer 408 as being unnecessary when the support 402 is of a colored polymer material.

The display arrangement 600 also utilizes a block 602 containing channels 604 being secured to the surface 418. These channels 604 run parallel to and adjacent to the elements 406 along the lengths of these elements 406. An appropriate heating or cooling fluid such as air or water may be circulated through any or all of these channels in a conventional manner in order to convey heat either to or away from the resistance elements 406 and the areas 410, 412 and 414 on these resistance elements.

In FIGS. 7 and 8 of the drawing there is shown a further modified display arrangement 700 of this invention, which utilizes a metallic support 702 having a surface 704 covered by a layer of paint 706 corresponding to the layer 16 previously described. This layer 706 holds a disk-like electrical resistance element 708 corresponding to the elements 406 previously described. A metal electric terminal member 710 is inserted through a hole 712 in the support 702 for the purpose of establishing electrical conduction to the center of this element 708. A small electrically nonconductive bushing 714 is used to isolate the terminal 720 from the support 712. Preferably a circular metallic coating 716 of an electrically conductive character is located so as to lead from the periphery (not numbered) of the element 708 to the support 702.

With this construction a wire 718 may be used in connection with the support 702 in supplying a current to the element 708 in order to cause the element 718 to heat. In the display arrangement 700 such heat is used to cause a temperature rise which will result in color changes in various areas 720, 722 and 724, corresponding to the areas 18, 20 and 22 previously described as the transition temperatures of the thermochromic materials used are achieved. As the element 708 heats up such areas 720, 722 and 724 will sequentially change in color as the transition temperatures of such areas are reached.

In FIG. 9 of the drawing there is shown another modified display arrangement 900 of the present invention which utilizes a metallic support 902 having a surface 904 covered by circular, disc resembling areas 906, 908 and 910 corresponding to the areas 720, 722 and 724 previously described. On the rear surface 912 a jacket 914 is provided. This jacket 914 is connected at its center and at its periphery to fluid conduits 916. Internally this jacket 914 is provided with a plurality of concentric walls 918, each having openings 920 formed therein. These walls 918 are shaped so as to correspond to the shapes of the areas 906, 908 and 910.

With this construction a heating or cooling fluid such as air, water or the like may be conveyed into or out of the jacket 914 through either of the conduits 916 so as to cause a sequential heating or cooling effect which will be regulated by the fluid flow. Such heating or cooling may be used to heat or cool the thermochromic materials in the areas 906, 908 and 910 so as to regulate the colors of these areas.

It is considered that the basic concepts of the invention may be utilized in a wide number of other different manners so as to create differently colored patterns, pictures or signs. When the invention is used for the latter purposes the various areas indicated in the preceding as being of a thermochromic character will normally be shaped so as to correspond to individual letters or numbers and/or will contain a plurality of letters or numbers. By expedients such as are indicated herein either ambient temperature and/or artificially induced temperatures may be easily and conveniently employed to obtain a wide variety of visual effects.

I claim:

1. A display arrangement including a support having a surface and visible areas of differently colored compositions located on said surface, in which the improvement comprises:

each of said compositions normally appearing as being of one color at one temperature and as being of another color at another different temperature, said compositions appearing as being differently colored at at least one temperature.

2. A display arrangement as claimed in claim 1 wherein:

said support is capable of conducting heat and including a darkened surface on the surface of said support adjacent to said areas of said compositions, said darkened surface facilitating the absorption and radiation of heat.

3. A display arrangement as claimed in claim 1 wherein:

said support is a metallic sheet capable of conducting heat, and said surface of said support around said visible areas and said areas are all of different colors at at least one temperature.

4. A display arrangement as claimed in claim 3 wherein:

said surface of said support is completely covered with a coating means for facilitating the absorption and radiation of heat and said areas of said compositions are located upon said coating means.

5. A process of operating a display arrangement including a support having a surface and visible areas of differently colored compositons located on said surface, each of said compositions normally appearing as being of one color at one temperature and as being of another color at another different temperature, said compositions appearing as being differently colored at at least one temperature, which comprises:

repeatedly heating and cooling said compositions so as to cause said compositions to change in color during such heating and cooling so as to vary the appearance of said display arrangement during such heating and cooling.

6. A process as claimed in claim 5 wherein:

said support and said areas are heated and cooled by being exposed to changing ambient temperatures.

7. A process as claimed in claim 6 wherein:

said surface is completely covered by a coating means for facilitating the absorption and radiation of heat and said areas of said compositions are located upon said coating means, and said support is a metallic sheet capable of conducting heat.

* * * * *